United States Patent [19]
Antoun

[11] Patent Number: 5,988,952
[45] Date of Patent: Nov. 23, 1999

[54] GROOVING AND THREADING TOOL

[76] Inventor: Gregory S. Antoun, P.O. Box 1057, Meadville, Pa. 16335

[21] Appl. No.: 09/083,921

[22] Filed: May 26, 1998

[51] Int. Cl.$^6$ .................................................... B23B 29/00
[52] U.S. Cl. ........................... 407/107; 407/108; 407/111; 407/112
[58] Field of Search .................................... 407/107, 101, 407/110, 102, 108, 111, 112

[56] References Cited

U.S. PATENT DOCUMENTS

| | | | |
|---|---|---|---|
| 3,125,798 | 3/1964 | Stein | 407/102 X |
| 4,227,838 | 10/1980 | Berry | 407/107 X |
| 4,286,901 | 9/1981 | Eckle . | |
| 4,471,675 | 9/1984 | Treloar . | |
| 4,555,202 | 11/1985 | Pondes . | |
| 4,558,974 | 12/1985 | Pano | 407/110 X |
| 4,744,703 | 5/1988 | Cochran | 407/112 X |
| 5,159,863 | 11/1992 | Simpson, III | 407/101 X |
| 5,271,440 | 12/1993 | Bradstreet, Jr. et al. . | |
| 5,439,039 | 8/1995 | Bradstreet, Jr. et al. . | |
| 5,542,794 | 8/1996 | Smith et al. . | |
| 5,542,795 | 8/1996 | Mitchell . | |
| 5,743,680 | 4/1998 | Von Haas et al. | 407/110 X |

FOREIGN PATENT DOCUMENTS

| | | |
|---|---|---|
| 463998 | 3/1950 | Canada . |
| 52-13184 | 2/1977 | Japan . |
| 620848 | 12/1980 | Sweden . |

*Primary Examiner*—Andrea L. Pitts
*Assistant Examiner*—Henry W. H. Tsai
*Attorney, Agent, or Firm*—Richard C. Litman

[57] ABSTRACT

A system for clamping a cutting insert on a grooving, threading, or milling tool wherein a top clamp member and a support plate are mounted on the tool's surface. The contacting surfaces of the tool, clamp member, and support plate are ground to a smooth finish. A cutting insert is formed with upper and lower V-shaped surfaces and is received in corresponding V-shaped recesses formed in edge portions of the top clamp member and the support plate. Bolts having left hand threads secure the top clamp member to the tool so as to clamp the insert between the top clamping member and the support plate.

15 Claims, 3 Drawing Sheets

GROOVING AND THREADING TOOL

BACKGROUND OF THE INVENTION

1. Field of the Invention

The present invention relates to grooving, threading, and milling tools typically used in metal cutting. More specifically, the present invention is drawn to a support structure for securely clamping a cutting insert on a grooving, threading, or milling tool wherein the cutting insert and support structure are fashioned with interlocked surfaces.

2. Description of the Related Art

Stability of the cutting insert is a major factor in ensuring accuracy in grooving, threading or milling functions. High speed operation of present day machine tools require that the cutting insert is tightly held to counteract the vibrational forces that can cause the insert to become misaligned with the workpiece.

A popular system, currently used to stabilize an insert, involves clamping the insert on the tool between a support surface and a top clamp member while employing a single fastener to attach the top clamp to the tool. This system locates the insert properly but fails to securely align the top clamp. Examples of this system is found in U.S. Pat. Nos. 4,286,901 (Eckle), 4,471,675 (Treloar), 4,555,202 (Pondes) and Swedish Patent Number 620,848.

U.S. Pat. Nos. 5,271,440 and 5,439,039 (both issued to Bradstreet, Jr. et al.) disclose a disposable knife blade having a serrated back bearing surface positioned between a serrated clamp member and a flat support surface. The instant patents are concerned with chipping wood from logs, which inventions have no matching engagement surfaces on the knife blade and the support surface.

U.S. Pat. Nos. 5,542,794 (Smith et al.), 5,542,795 (Mitchell), U.S. Pat. No. 463,998 (Canada), and U.S. Pat. No. 5,213,184 (Japan) disclose milling machines wherein cutting inserts are wedged into insert seats. Forces generated during the cutting process would tend to spread the insert seats apart over a period of time.

None of the above inventions and patents, taken either singularly or in combination, is seen to disclose a grooving, threading, or milling tool having a cutting insert positioned between a support member and a clamping member as described and claimed in the present invention.

SUMMARY OF THE INVENTION

The present invention describes a system for clamping a cutting insert on a grooving, threading, or milling tool. The system includes a tool body having a smooth flat planar mounting surface which has been highly polished by grinding. A support blade and a top clamp member each have smooth flat planar inside surfaces also highly polished by grinding. The support blade and the top clamp member have their inside surfaces aligned on the planar mounting surface of the tool body and attached thereto. A cutting insert is clamped between the support blade and the top clamp member such that the insert's position is maintained throughout the grooving, threading, or milling operation.

Accordingly, it is a principal object of the invention to provide an improved clamping system for a cutting insert used in metal cutting operations.

It is another object of the invention to provide an improved clamping system for a cutting insert which will provide stability for the insert during high speed cutting operations.

It is a further object of the invention to provide an improved clamping system for a cutting insert which will maintain the insert's alignment with a workpiece.

Still another object of the invention is to provide an improved clamping system for a cutting insert which system may be adapted to grooving, threading, and milling operations.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
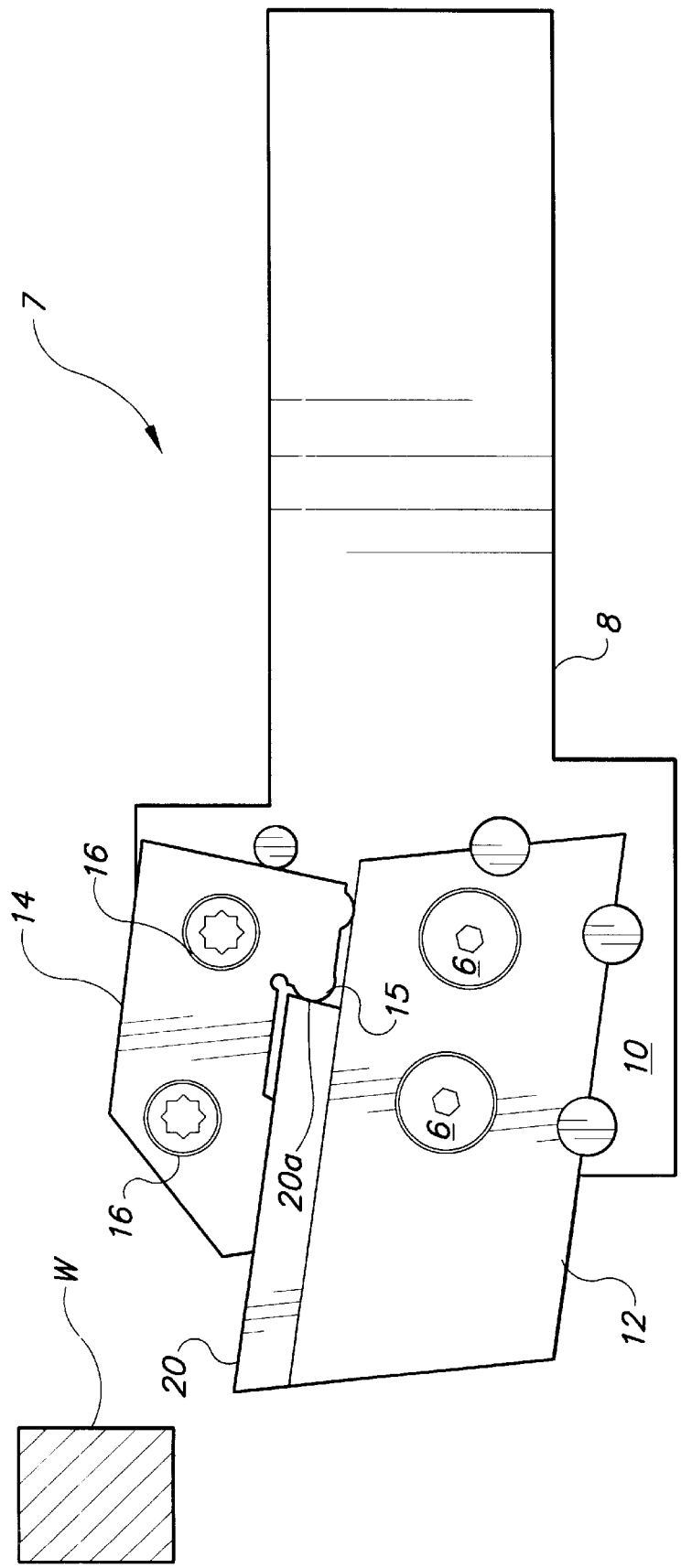
FIG. 1 is an environmental view of a grooving and threading tool according to the present invention.
Figure 2:
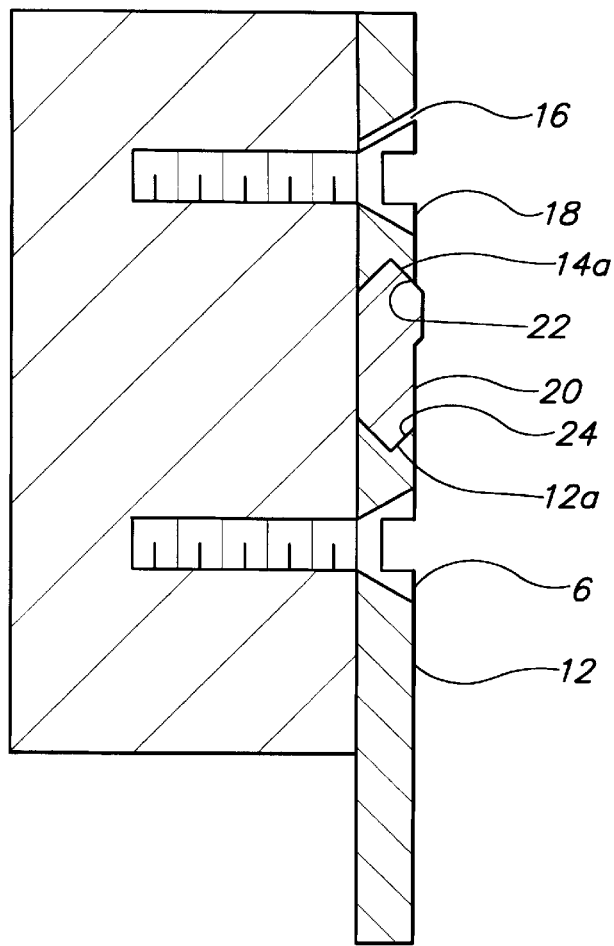
FIG. 2 is a section view taken to show interlocked clamping surfaces.
Figure 3:
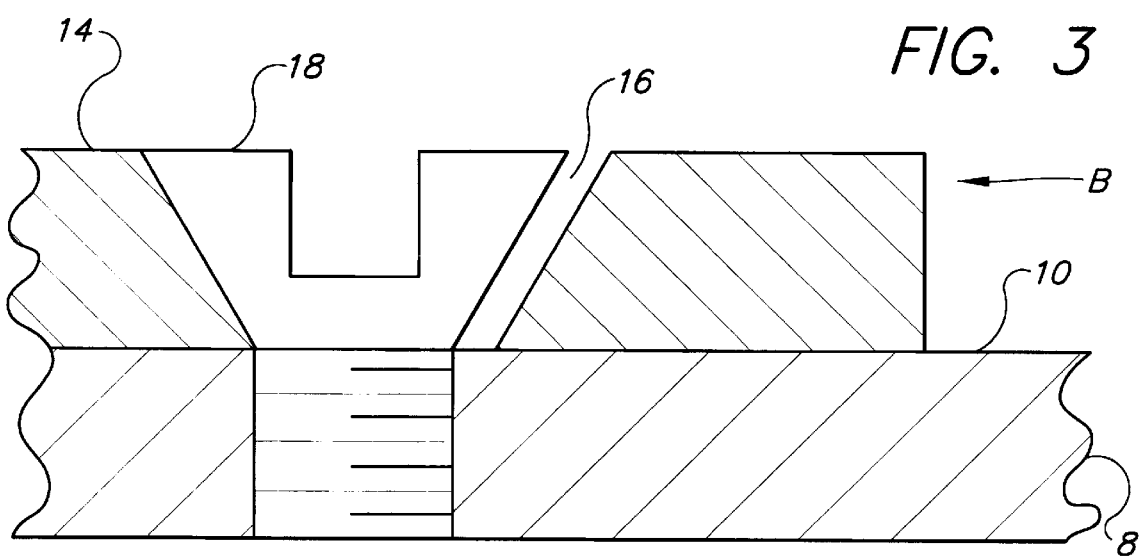
FIG. 3 is a partial view of FIG. 1 to show the bolt head configuration

The clamping system of the present invention as illustrated in FIGS. 1–3 includes a grooving or threading tool 7 positioned adjacent a workpiece W. The tool 7 comprises a body member 8 which is provided with a planar mounting surface 10. Mounting surface 10 is polished to a smooth flat finish by grinding. A support blade 12 and a top clamp member 14 are each provided with inner planar surfaces that are also polished, by grinding, to a smooth flat finish. Support blade 12 and clamp member 14 are positioned on body member 8 in a manner such that the inner surfaces of blade 12 and clamp member 14 are in contact with mounting surface 10. The polished finishes of the contacting surfaces provides for a very good alignment of all elements of the clamping system. Standard bolts 6 are used to attach support blade 12 to body member 8.

Clamp member 14 has two conical bores 16, which are each asymmetrically positioned (off center) relative to a longitudinal axis of the clamp member 14, each bore 16 adapted to receive a bolt 18. Bolts 18 are provided with conical heads that match the angle of the conical bores 16 thereby exerting a wedging force in the direction of arrow B (FIG. 3) that is greater than the normal tightening force of the bolts and allowing clamp member 14 to maintain perpendicular movement in a clamping direction with surface 10. Bolts 18 are formed with left hand threads for affixing clamp member 14 to body 8.

Support blade 12 and clamp member 14 are interposed by a cutting insert 20. As best seen in FIG. 2, cutting insert 20 is ground to present a V-shaped configuration on upper and lower clamping surfaces 22 and 24. Clamp member 14 and support blade 12 have V-shaped recesses formed therein respectively at a lower edge 14a and an upper edge 12a. The angles of V-shaped recesses 14a and 12a are designed to match the angles of v-shaped clamping surfaces 22 and 24 so as to receive the surfaces in interlocking engagement when bolts 6 and 18 are tightened.

Clamp member 14 is provided with an insert stop part 15 as shown in FIG. 1. Cutting insert 20 has an edge portion 20a in abutting relationship with stop 15. Stop part 15 and edge 20a form complimentary angles. This arrangement will cause the cutting force pushing against clamp member 14, by way of cutting insert 20, to pull clamp member 14 tighter against insert 20.

Figure 4:
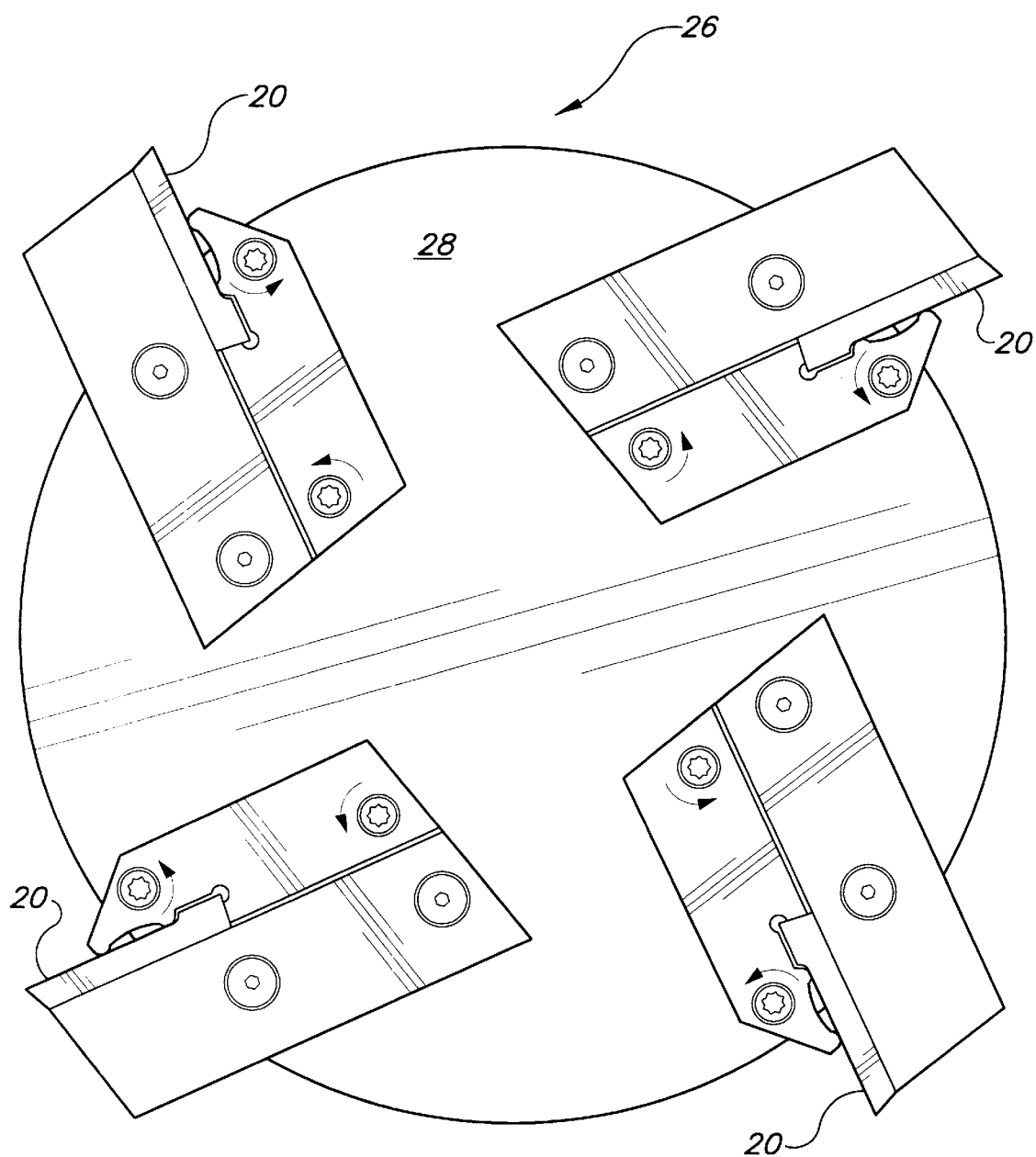
FIG. 4 is an elevational view of the invention as adapted to milling structure.

FIG. 4 illustrates the instant invention adapted to a milling tool 26. Milling tool 26 presents a flat planar surface 28 which surface has been polished to a smooth finish by grinding. Plural cutting inserts 20 are spaced around the milling tool as well known in the art. Inserts 20 utilize the clamping system of the present invention, as set out in the above paragraphs, for attachment to surface 28.

It is to be understood that the present invention is not limited to the embodiments described above, but encompasses any and all embodiments within the scope of the following claims.

I claim:

1. A tool adapted for use in metal cutting comprising:

a body member, said body member having a ground planar surface;

a support plate, said support plate having a ground planar inner surface and an upper edge;

a top clamp member, said top clamp member having a ground planar inner surface and a lower edge;

means for attaching said support plate to said body member such that said inner surface of said support plate interfaces said planar surface of said body member, said means for attaching said support plate comprises bolts;

means for attaching said top clamp member to said body member such that said inner surface of said top clamp member interfaces said planer surface of said body member and such that said lower edge of said top clamp member is spaced from said upper edge of said support plate, said means for attaching said top clamp member includes two conically shaped bores asymmetrically spaced on said top clamp member;

a cutting insert mounted between said support plate and said top clamp member;

an upper surface formed on said cutting insert and engaged with said lower edge of said top clamp member;

a lower surface formed on said cutting insert and engaged with said upper edge of said support plate.

2. A tool as defined in claim 1 wherein said tool is a threading tool.

3. A tool as defined in claim 1 wherein said tool is a grooving tool.

4. A tool as defined in claim 1 wherein said tool is a milling tool.

5. A tool as defined in claim 1 wherein said means for attaching said top clamp member also includes two bolts adapted for insertion into said two conically shaped bores whereby said two bolts fasten said top clamp member to said planar surface of said body member.

6. A tool as defined in claim 5 wherein said two bolts for fastening said top clamp member are formed with conical heads which match the shape of said conical bores.

7. A tool as defined in claim 6 wherein said two bolts for fastening said top clamp member are provided with left hand threads.

8. A tool as defined in claim 7 wherein said upper surface and said lower surface of said cutting insert are formed in a V-shaped configuration.

9. A tool as defined in claim 8 wherein said upper edge of said support plate is formed as a V-shaped recess which matches the V-shaped configuration of the lower surface of said cutting insert whereby said recess receives said lower surface therein.

10. A tool as defined in claim 9 wherein said lower edge of said top clamp member is formed as a V-shaped recess which matches the V-shaped configuration of the upper surface of said cutting insert whereby said recess of said lower edge receives said upper surface therein.

11. A tool as defined in claim 10 wherein said top clamp member is provided with a stop portion and wherein said cutting insert is provided with an edge portion which abuts said stop portion.

12. A tool as defined in claim 11 wherein said stop portion and said edge portion form complimentary angles.

13. A tool as defined in claim 12 wherein said tool is a grooving tool.

14. A tool as defined in claim 12 wherein said tool is a threading tool.

15. A tool as defined in claim 12 wherein said tool is a milling tool.

* * * * *